June 25, 1940.    R. HERZOG    2,205,560
DISTANCE INDICATION MEANS AND METHOD
Filed March 8, 1938
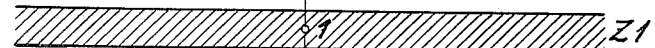
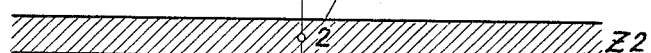
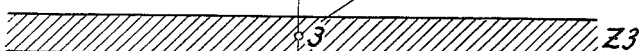
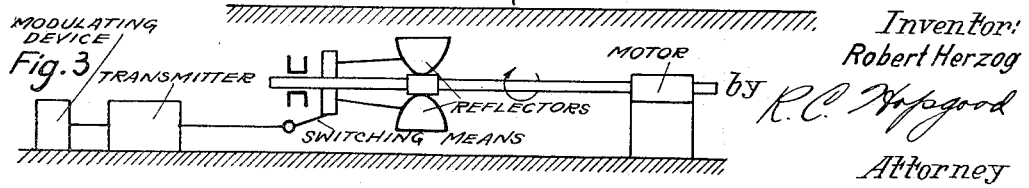
Inventor:
Robert Herzog
by R. C. Hapgood
Attorney Patented June 25, 1940

2,205,560

UNITED STATES PATENT OFFICE 2,205,560

DISTANCE INDICATION MEANS AND METHOD

Robert Herzog, Berlin, Germany, assignor to C. Lorenz Aktiengesellschaft, Berlin-Tempelhof, Germany, a company Application March 8, 1938, Serial No. 194,630
In Germany April 4, 1936

3 Claims. (Cl. 250—11)

The present invention relates to methods of distance indications along a given course line.

It is frequently desirable to transmit distance indications to vehicles, particularly aircraft, moving along a given course line between two points. Such distance indications are well known, for example for landing aeroplanes in accordance with the slip-way principle, where a given distance to the landing point is marked by walls of radiation vertical to the ground surface and at right angles to the course line. However, these arrangements suffer under the disadvantage that their usefulness for distance determination is limited to short ranges only since the zones between the stationary walls or planes of radiation must be relatively small in order to enable successive position indications to be received by the vehicle. This method is inadequate for long ranges, e. g. between two airports.

The above mentioned disadvantages are avoided according to the present invention which has for its object to provide distance determination at any time at each arbitrarily selected point on a given course line.

According to the invention, the distance indication is accomplished by the provision of transmitting equipments along a given course line and spaced in accordance with a predetermined scheme known to the pilots. The transmitters radiate sharply concentrated beams of very short waves, preferably having wavelengths equal to fractions of meters or decimeters. These bundles of rays are caused to revolve about an axis parallel to the ground surface so as to erect walls or planes of radiation at right angles thereto.

The invention will be fully understood from the following description and be pointed out in the appended claims, reference being made to the accompanying drawing, in which:

Fig. 1 is a diagrammatical plan which serves for explaining the inventive idea, while Fig. 2 diagrammatically illustrates the mode of operation according to the invention. Fig. 3 is a diagrammatic illustration of the means for practicing the invention.

There are shown in Fig. 1 two points or airports I and II and the line which interconnects these two points represents the course line. In accordance with the invention, transmitters are provided at the points 1, 2 and 3, the rotating beams of which form the radiation walls or planes Z1, Z2 and Z3. The widths of these zones of radiation are in a predetermined ratio to the linear speed of the vehicle in question and to the rotational speeds of the beams radiated by the transmitters so as to prevent that the vehicle pass through the zone without noticing the rotary beams. The bundles of rays radiated from the transmitters 1 to 3 include characteristic signals which are adapted to indicate the given distance to the pilot. Since not only the distance between the points I and II, but also the distances between the zones relative to each other and to the points I and II are known, the momentary distance from the points I or II may be determined by the pilot from the characteristic signals received. In fact, a divergence from the straight course line will be manifested by a slight change of the distance indication, but this is insignificant as far as the necessary widths of the zones Z1 to Z3 are concerned because the indication does not require such high accuracy.

Fig. 2 illustrates one embodiment of a transmitting arrangement which employs two oppositely directed radiating reflectors R1 and R2. The reflector which happens to be directed upward radiates a sharp beam. The oppositely directed radiators are rotated as indicated by the arrow. As soon as the ray from the one reflector reaches the horizontal plane, this reflector is disconnected from the transmitter, while the other radiator is connected thereto so as to continuously provide a beam above the ground surface. The width of the zone is determined by the sharpness of the beam and varies depending upon the vertical space relative to the ground surface. The sharpness of the beam, in turn, depends upon the angle $\alpha$ at which the radiation is effected. The means operating the reflectors are diagrammatically indicated in Fig. 3.

In accordance with a further feature of the invention, the individual zones are identified by the rotational speed of the radiator allotted to each zone. For example, if the beam circulates at 250 revolutions per second, then the receiver of the vehicle is struck 500 times per second by the beam. These 500 impulses produce a tone-frequency which is adapted to identify the zone. However, the angular velocity of the circulating ray is limited by the characteristics of the receiver, since the impulses transmitted at very high rotational speeds become extraordinarily short. The shorter the building-up time of the receiver can be made, the higher may be the speed of rotation of the beam.

What is claimed is:

1. A method of distance indication along a given course line which comprises the following steps: producing at predetermined points on said line beams of short wave radiations, continuously rotating said beams to produce walls of short wave radiations perpendicular to the ground and the course line, continuously producing characteristic signals in the radiation within each wall, and determining the distance by characteristic signals encountered within a wall.

2. A method of distance indication along a given course line which comprises the following steps: radiating at predetermined points on said line beams of short wave lengths, continuously rotating each beam at a different speed, confining the radiation at each point within a wall perpendicular to the ground and at right angles to the line, and indicating the distance by the speed of rotation of the beam.

3. An arrangement for distance indication along a course line, comprising a transmitter at each of a plurality of predetermined points along said line, each transmitter including a pair of radiating reflectors pointed in opposite directions and rigidly coupled with one another, means for rotating each pair of reflectors on an axis substantially parallel with the earth's surface at a different speed, and switching means for connecting one reflector of each pair with the transmitter during one-half, and the other during the other half of their respective revolutions.

ROBERT HERZOG.